INVENTOR.
EDWARD R. NEUMAN

ATTORNEYS

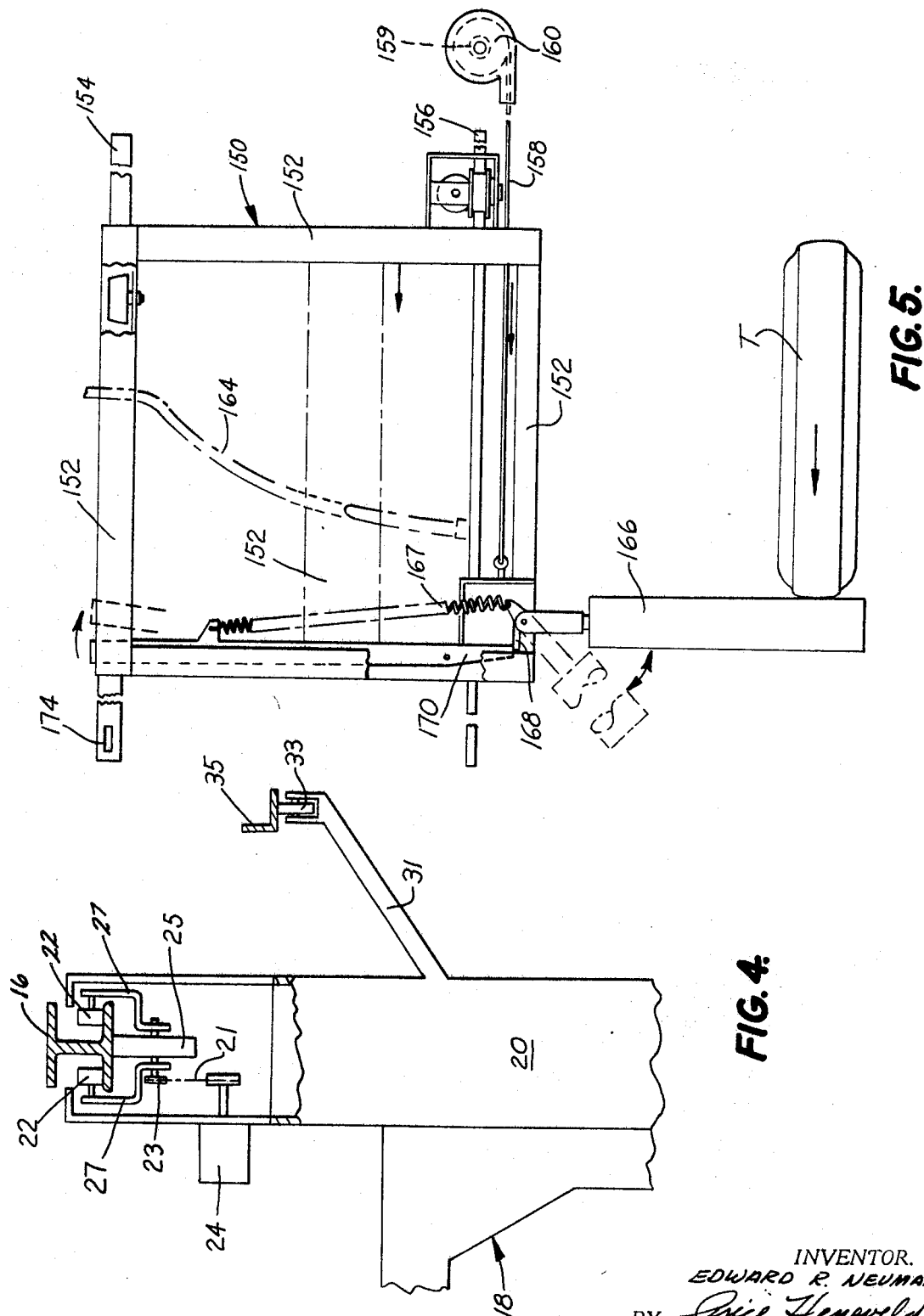

United States Patent Office 3,510,352
Patented May 5, 1970

3,510,352
AUTO WASH
Edward R. Neuman, 315 W. 40th St.,
Holland, Mich. 49423
Filed Oct. 25, 1967, Ser. No. 677,933
Int. Cl. B60s 3/04
U.S. Cl. 134—45                                                    1 Claim

ABSTRACT OF THE DISCLOSURE

Vehicle washing apparatus employing a recirculatory washer means having a combination of cooperative oscillating nozzles on an inverted L-shaped support, and a revolving disc of jets, preferably in combination with auto wheel revolving means and wheel advancing washing means.

BACKGROUND OF THE INVENTION

This invention relates to vehicle washing equipment, and more particularly to recirculating auto wash equipment.

Of vehicle washing equipment known, probably the most effective is that which performs a series of sequential operations such as spraying, brushing, wiping, etc., as the vehicle is towed along by a conveyor. Such equipment requires a large amount of space and a great expenditure. Another type of apparatus which requires only a small space and a relatively small investment employs a washer means that circulates around a stationary vehicle. Until now, however, the washing action of this latter type of apparatus is not very effective.

SUMMARY OF THE INVENTION

It is an object of this invention to provide a novel form of the recirculating type auto wash apparatus that has an effective washing action as well as having the advantages of low cost and small space requirements, by employing a special combination of oscillating water nozzles and rotating water jets. The water stream action is such as to effectively hydrodynamically scrub and sweep all body surfaces of the vehicle, even at the junctures of the sides with the roof, in a manner to loosen dirt and film and propel such off the vehicle. Dynamic hydraulic action on the auto surfaces causes the dirt to be acted upon from several directions, so that the cleaning action is much more effective than prior recirculating washer equipment.

Another object of this invention is to provide such a recirculating auto wash that also has cooperative auto wheel rotating and washing means in combination therewith.

The apparatus basically comprises a track mounted, recirculating washer means employing a combination of an inverted L-shaped support with oscillating, laterally and downwardly extending nozzles, and a spinning disc with radially positioned laterally oriented water jets.

BRIEF DESCRIPTION OF THE DRAWINGS

FIG. 4 is an enlarged fragmentary view of a portion of the suspension and driving mechanism for the apparatus; and FIG. 5 is an enlarged plan view of one of the wheel advancing and washing devices.

DESCRIPTION OF THE PREFERRED EMBODYMENT

Figure 1:
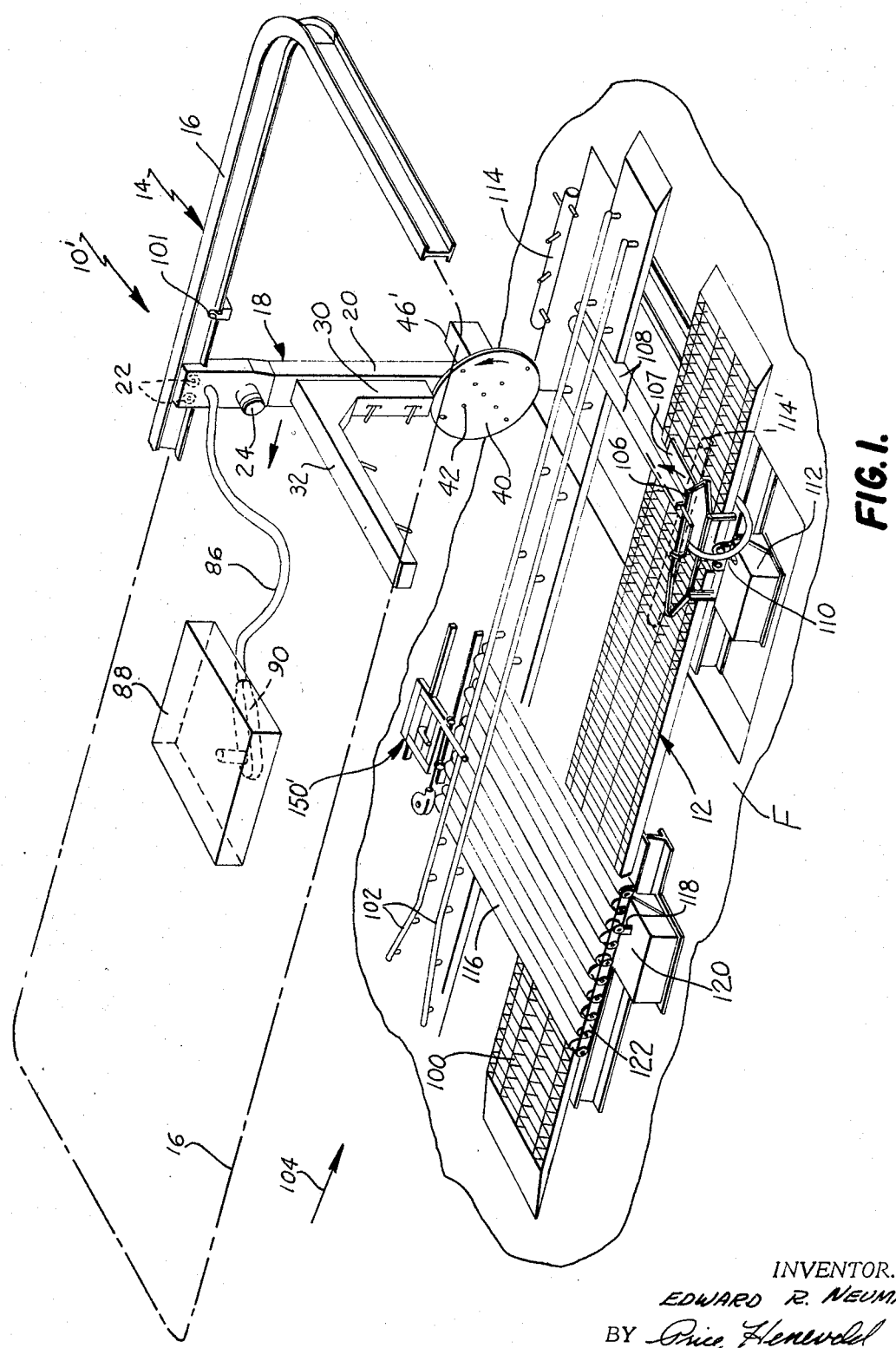
FIG. 1 is a perspective view of the novel vehicle washing system.

Referring now specifically to the drawings, the system 10 illustrated in FIG. 1 includes the lower subassembly 12 and the upper subassembly 14.

The upper subassembly includes a circuitous track 16 which is normally above the vehicle, and which has length and width dimensions somewhat larger than those of a vehicle, to thereby extend laterally, forwardly and rearwardly therebeyond when a vehicle is positioned in the apparatus. Mounted upon this track is recirculator washer means 18. This washer means has a generally vertical suspension support 20 suspended by roller members 22 from track 16, in a depending manner. Mounted to the upper end of this element 20 is an electrical motor 24 operably connected with chain 21 and sprocket 23 to a drive roller 25 which engages the underside of track 16. Rollers 22 and 25 are mounted to brackets 27, and provide a vertically stable mount to track 16. Lateral sway is prevented as the unit turn corners by diagonal out rigger brace 31 which extends outwardly and upwardly to terminate in an idler roller 33 that engages a circuitous supplemental track 35.

Mounted to the inside face of element 20 is an inverted L-shaped support having a downwardly extending vertical leg 30 and a laterally extending horizontal leg 32 protruding part way toward the track on the opposite side and elevated to extend above the vehicle roof. Projecting from each of these legs is a plurality of oscillating water nozzles. More specifically, at least two nozzles 34 spaced vertically of each other project laterally from vertical leg 30 generally toward the space within and beneath the peripheral outline of the track. Projecting downwardly from horizontal leg 32 is at least two laterally (horizontally) spaced nozzles 36. These nozzles oscillate generally in the same plane, i.e. nozzles 34 oscillating up and down in a vertical plane through an arc. This will be described more fully hereinafter.

Positioned below the L-shaped member and mounted to support 20 is a vertically oriented, laterally facing rotational disc 40 having a plurality of water jet nozzles 42 spaced at varying radial distances from the disc spin axis and projecting laterally toward the auto receiving space beneath track 16.

Figure 3:
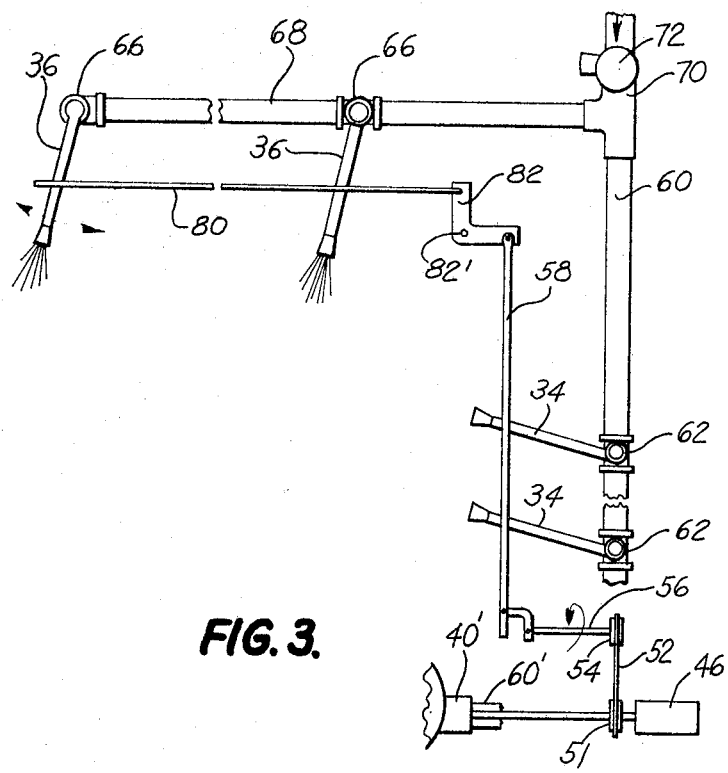
FIG. 3 is a fragmentary elevational view of the operative components in the apparatus illustrated in FIG. 2.

Disc 40 is hollow, having water supplied to it from pipe 60 through pipe extension 60' leading through the hub 40' (FIG. 3) to the disc. Also mounted to member 20 is an electrical motor 46 which has its output shaft rotationally connected to the drive hub 40' of disc 40 (FIG. 3). Motor 46 is in housing 46' attached to the lower end of support 20. This motor is also operably connected with oscillating linkage to nozzles 34 and 36 to oscillate them. More specifically, motor 46 is operably connected to a rotational crank 50 through sprocket 51, chain 52, and sprocket 54, to shaft 56 upon which crank 50 is mounted. The motor rotates crank 50 to vertically oscillate a link 58 attached on one end to the crank. Link 58 has openings receiving the elongated nozzles 34 intermediate their ends. These nozzles are each mounted on one of their ends to a vertical water supply pipe 60 by hollow swivel joints 62 that allow water flow through the joints to the nozzles and to connecting portions of the water pipe. With vertical reciprocation of link 58, nozzles 34 are shifted upwardly and downwardly through a substantial acute arc of about 90° or so for oscillating the spray onto the vehicle surface. These nozzles are located first above and first below the average vehicle roof height. This spray pattern from nozzles 34 has a particular cleaning action on the juncture portion of the vehicle body between the sides and the top. It also overlaps the spray pattern from the lower rotating disc 40 so that, in the juncture areas where the spray from the disc merely glances off the surface, the oscillating spray pattern causes attack of the surface film at several different angles and subsequently advancing of the dirt off the surface. The vertically oscillating spray pattern also overlaps the oscillating spray pattern from nozzles 36.

Nozzles 36 are also mounted by swivel joints 66 to their horizontal water supply pipe 68. Pipes 60 and 68 are both supplied from a common line 70 controlled by a solenoid operated valve 72. Nozzles 36 are oscillated by a link 80 which is interconnected to link 58 by a bell crank 82 pivotally mounted at 82′ to L-shaped member 30, in the center of the bell crank. Bell crank 82 is also pivotally connected at its ends to links 58 and 80 to cause translation of the vertical movement of link 58 to horizontal movement of link 80.

Water to solenoid valve 72 and main inlet line 80 is supplied through a flexible conduit 86 from a centrally positioned supply means 88 shown in general form in FIG. 1. This supply means is located centrally of the circuitous track 16, and has a swivel connection 90 to hose 86 to enable the hose to supply water as the washer means recirculates around the track. Preferably, nozzles 34 are oscillated upwardly when the nozzles 36 are oscillated away from nozzles 34 and vice versa.

Thus, the overhead downwardly projecting nozzles 36 have a cooperative spray pattern with the side mounted laterally projecting oscillating nozzles 34, and the side mounted laterally projecting nozzles 34 have an overlapping spray pattern with the revolving disc nozzles. The resulting cooperation causes effective cleaning of all of the surfaces of the vehicle which are at various angles to each other, and causes effective loosening and removal of dirt with the special spray patterns developed. Both of these factors have been proven by usage of the equipment to cause effective cleaning.

The lower subassembly 12 includes vehicle receiving ramp means which may incorporate a series of drainage type wheel support grids 100 shown for receiving the right and rear wheels of the vehicle, and also preferably includes a wheel guide formed of a pair of elevated rails 102 for receiving the left front and rear wheels of a vehicle moving in the receiving direction indicated by the arrow 104. Mounted adjacent one of the fornt wheels, e.g. the right front wheel in the illustrated form of the structure, is a wheel sensing means 106 which electrically activates motor 46, motor 24, and solenoid valve 72 in a manner to be described hereinafter, when depressed. A wheel stop 107 pivoted from a lowered horizontal position (solid lines) to a raised vertical position (phantom lines) is engaged by a front wheel tire to locate the auto during washing. Also positioned beneath the front wheel area of the ramp is a plurality of powered wheel rotating rollers 108 which are power driven through a chain 110 by a power motor means in housing 112. Adjacent the rear wheel receiving area of the ramp means is a plurality of powered wheel rotating rollers 116. It will be noted that several rollers are positioned adjacent each other lengthwise of the vehicle to accommodate the particular position of the rear wheels depending upon the length of the vehicle. These rollers are also power driven by chain 118 from a power motor means inside housing 120, and by a chain 122 interconnecting the rollers. Preferably, the sensing and actuator means 106 also activates the power motor means for these front and rear wheel rotating means and activates the solenoid valve means to the wheel washing means now to be described.

The wheel washing units may be simple manifold-multiple jet units shown for illustration purposes at 114 and 114′ adjacent the front wheel zones, or may be the more preferred wheel washer units of the type illustrated in FIG. 5 at 150 (for the right wheels). Since these subassemblies are mirror images of each other, only one will be described.

Specifically, subassembly 150 includes a suitable carriage 152 rollably mounted on tracks 154 and 156, or the like, and normally biased toward and returnable to its extreme position toward an incoming vehicle. This may be done with an extensible cable 158 biased by a coil spring 159 back into a reeled position in fixed receiver 160, and connected to carriage 152. To the carriage is mounted a tire washing nozzle 162 which may be supplied with water from a flexible hose 164. Also secured to carriage 152 is a trippable lever 166 which is pivotally mounted at one end and projects into the path of a vehicle wheel and tire T. It is normally biased by spring 167 and latched in a laterally projecting position in the path f a wheel by its finger 168 engaging a pivotal stop 170 to cause the wheel to carry the carriage along. When carriage 152 reaches its extreme position, stop 170 engages trip 174 and pivots to release finger 168, allowing lever 166 to unlatch and pivot out of the path of tire T. This allows cable 158 to return the carriage to start position for the next wheel.

Figure 2:
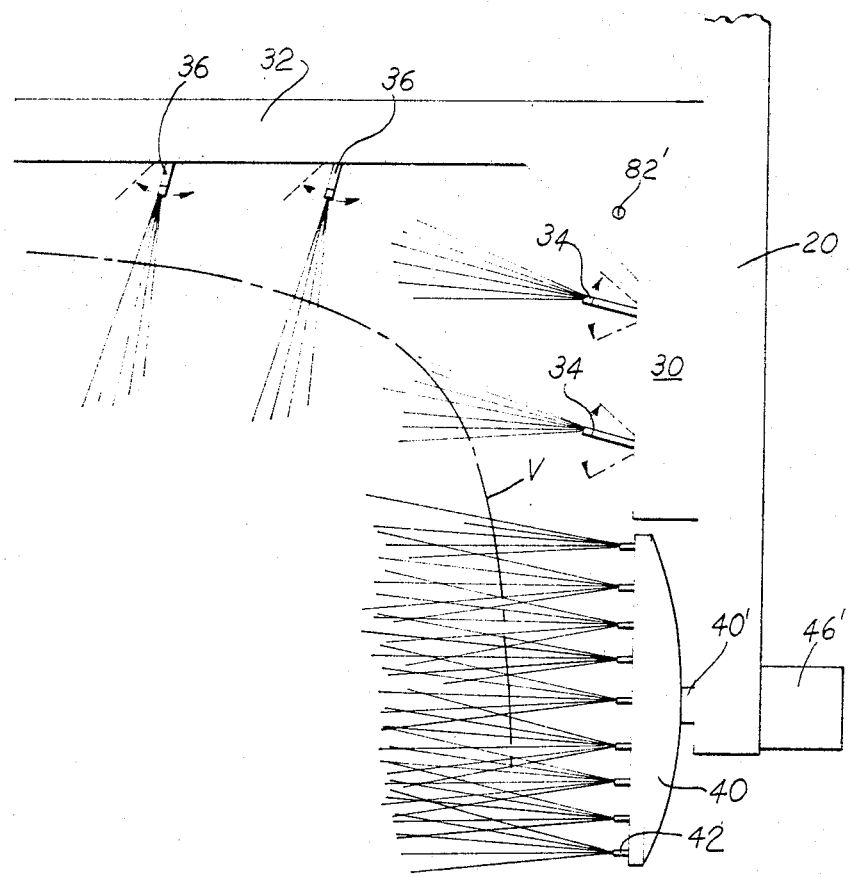
FIG. 2 is an enlarged side elevational fragmentary view of the most significant portions of the apparatus in FIG. 1.

The operation of the apparatus will be basically understood from the above description of the apparatus. Briefly, lower subassembly ramp means 12 is mounted on a floor surface F while upper subassembly 14 is suspended beneath the ceiling of an enclosure, with the vehicle V being driven into position in the direction indicated by arrow 104 to the position shown by vehicle V in FIG. 2. As the wheels engage the wheel washing subassemblies, the latter are pushed along to wash the vehicle wheels. When the right front wheel of the vehicle depresses the activator 106, just prior to engaging stop 107, an electrical circuit actuates motor 46 for spinning disc 40 and for oscillating nozzles 34 to 36, to actuate motor 24 to cause the recirculation of the washer means around the track and hence around the vehicle, and to activate solenoid valve 72 to open it, thereby allowing water to flow to the nozzles and to the disc. The washer means recirculates a controlled number of times around the vehicle, causing the special spray pattern to effectively clean the vehicle. The control of the number of times that the washer means recirculates around the vehicle can be effectively achieved using suitable limit switch means 101 on track 16, preferably in combination with a suitable timer.

Those having ordinary skill in this art, upon studying this disclosure, will probably think of additional advantages than those specifically recited. It is also conceivable that certain minor deviations from the construction shown, particularly in the details of the drive mechanism and the water connections, may be readily made. Hence, it is intended that the invention is to be limited only by the scope of the appended claim, and the reasonably equivalent structures to those defined therein.

I claim:

1. A circulating vehicle wash apparatus comprising: circuitous track means of dimensions larger than those of the normal automobile, to extend beyond the auto outline; recirculatory washer means movably mounted on said track means to follow said track means; said washer means having in combination revolving, laterally facing, water spray disc means having a plurality of water jets projecting laterally therefrom, an inverted L-shaped support with one upper horizontal leg and one lower vertical leg, a plurality of oscillating water nozzles projecting laterally from said vertical leg and projecting downwardly from said horizontal leg, power motor drive means operatively connected to said disc to rotate it and to said nozzles to oscillate them; and water supply means to said jets and nozzles, whereby an effective combination washing action of a vehicle can be obtained with recirculation of said washer means, power motor means operably engaged to circulate said washer means along said track means, power operated valve means for said water supply means, powered wheel rotator means and wheel washer means adjacent thereto, and wheel repsonsive actuator means operably associated with both said power motor means adjacent thereto, and wheel responsive actuator them.

References Cited

UNITED STATES PATENTS

| | | | |
|---|---|---|---|
| 2,814,825 | 12/1957 | Guthrie et al. | 134—123 XR |
| 2,862,222 | 12/1958 | Cockrell | 134—123 XR |
| 2,936,770 | 5/1960 | Emanuel | 134—123 |
| 3,167,797 | 2/1965 | Hergonson | 134—123 XR |
| 3,259,138 | 7/1966 | Heinicke | 134—45 |
| 3,261,369 | 7/1966 | Thiele | 134—123 |
| 3,391,701 | 7/1968 | Richardson et al. | 134—123 |
| 3,400,727 | 9/1968 | Daum et al. | 134—123 XR |
| 2,896,644 | 7/1959 | Emanuel | 134—123 XR |
| 3,237,598 | 3/1966 | Zahn | 239—186 XR |

FOREIGN PATENTS

| | | |
|---|---|---|
| 393,946 | 11/1965 | Switzerland. |
| 1,213,822 | 4/1960 | France. |

OTHER REFERENCES

Auto Laundry News, vol. 3, No. 11, "The Kwiki Whirlaway," November 1965, p. 38.

ROBERT L. BLEUTGE, Primary Examiner

U.S. Cl. X.R.

134—181; 239—186, 227

PO-1050
(5/69)

UNITED STATES PATENT OFFICE
CERTIFICATE OF CORRECTION

Patent No. 3,510,352  Dated May 5, 1970

Inventor(s) Edward R. Neuman

It is certified that error appears in the above-identified patent and that said Letters Patent are hereby corrected as shown below:

Column 5, line 2; delete "adjacent thereto, and wheel responsive actuator", and insert --- and said power operated valve means to actuate ---.

SIGNED AND
SEALED
SEP 15 1970

(SEAL)
Attest:

Edward M. Fletcher, Jr.
Attesting Officer

WILLIAM E. SCHUYLER, JR.
Commissioner of Patents